United States Patent
Yu et al.

(10) Patent No.: US 8,259,255 B2
(45) Date of Patent: Sep. 4, 2012

(54) BACKLIGHT MODULE AND LIQUID CRYSTAL DISPLAY USING SAME

(75) Inventors: Chuan-Pei Yu, Miao-Li (TW); Ming-Chuan Chou, Miao-Li (TW)

(73) Assignee: Chimei Innolux Corporation, Chu-Nan, Miao-Li County (TW)

( * ) Notice: Subject to any disclaimer, the term of this patent is extended or adjusted under 35 U.S.C. 154(b) by 129 days.

(21) Appl. No.: 12/215,771

(22) Filed: Jun. 30, 2008

(65) Prior Publication Data
US 2009/0002599 A1    Jan. 1, 2009

(30) Foreign Application Priority Data

Jun. 29, 2007  (CN) .......................... 2007 1 0076256

(51) Int. Cl.
*G02F 1/1335* (2006.01)

(52) U.S. Cl. .......................................... 349/64; 349/103

(58) Field of Classification Search .................... 349/64, 349/103
See application file for complete search history.

(56) References Cited

U.S. PATENT DOCUMENTS

| | | | | |
|---|---|---|---|---|
| 5,751,388 A * | 5/1998 | Larson | | 349/96 |
| 5,999,239 A * | 12/1999 | Larson | | 349/96 |
| 6,099,758 A * | 8/2000 | Verrall et al. | | 252/585 |
| 6,166,799 A * | 12/2000 | Kameyama et al. | | 349/185 |
| 6,310,671 B1 * | 10/2001 | Larson | | 349/96 |
| 6,340,999 B1 * | 1/2002 | Masuda et al. | | 349/63 |
| 6,456,347 B1 * | 9/2002 | Motomura et al. | | 349/117 |
| 6,608,660 B1 * | 8/2003 | Okamoto et al. | | 349/113 |
| 6,747,714 B2 * | 6/2004 | Okumura | | 349/61 |
| 7,218,363 B2 * | 5/2007 | Ozawa et al. | | 349/114 |
| 7,290,917 B2 | 11/2007 | Cho et al. | | |
| 7,425,089 B2 * | 9/2008 | Masuda | | 362/617 |
| 7,483,102 B2 * | 1/2009 | Daiku | | 349/116 |
| 7,535,529 B2 * | 5/2009 | Maeda et al. | | 349/114 |
| 2004/0004681 A1 * | 1/2004 | Ozawa et al. | | 349/61 |
| 2004/0223094 A1 * | 11/2004 | Hamada et al. | | 349/63 |
| 2006/0274241 A1 * | 12/2006 | Maeda et al. | | 349/114 |
| 2007/0014127 A1 * | 1/2007 | Hara et al. | | 362/611 |
| 2007/0076149 A1 * | 4/2007 | Daiku | | 349/116 |
| 2007/0247575 A1 * | 10/2007 | Maeda et al. | | 349/114 |
| 2008/0074591 A1 * | 3/2008 | Hamada et al. | | 349/112 |
| 2009/0067047 A1 * | 3/2009 | Ueda et al. | | 359/485 |

FOREIGN PATENT DOCUMENTS

| | | | |
|---|---|---|---|
| CN | 1508595 | A | 6/2004 |
| CN | 2658778 | Y | 11/2004 |
| CN | 1601352 | A | 3/2005 |
| CN | 1790123 | A | 6/2006 |
| JP | 11-311782 | A | 11/1999 |
| TW | 200707020 | A | 2/2007 |

* cited by examiner

*Primary Examiner* — K. Cyrus Kianni
(74) *Attorney, Agent, or Firm* — Muncy, Geissler, Olds & Lowe, PLLC

(57) ABSTRACT

An exemplary backlight module includes a light guide plate (210), a light source (211), and a retardation layer (214). The light guide plate includes a light incident surface (2120) and a light emitting surface (2121) adjacent to the light incident surface. The light source is configured to emit polarized light with a first polarization orientation, and is located at a side of the light incident surface. The retardation layer is disposed at a side of the light emitting surface, and is configured to rotate the first polarization orientation of the polarized light to a second polarization orientation.

7 Claims, 1 Drawing Sheet

BACKLIGHT MODULE AND LIQUID CRYSTAL DISPLAY USING SAME

CROSS-REFERENCE TO RELATED APPLICATION

This application is related to, and claims the benefit of, a foreign priority application filed in China as Serial No. 200710076256.0 on Jun. 29, 2007. The related application is incorporated herein by reference.

FIELD OF THE INVENTION

The present invention relates to backlighting, and more specifically to backlight modules and liquid crystal displays (LCDs) using the same.

GENERAL BACKGROUND

Because typical LCD devices have the advantages of portability, low power consumption, and low radiation, they have been widely used in various portable information products such as notebooks, personal digital assistants (PDAs), video cameras, and the like. Furthermore, LCD devices are considered by many to have the potential to completely replace CRT (cathode ray tube) monitors and televisions.

In FIG. 3, a conventional normal-white type LCD 10 includes an LCD panel 100 and a backlight module 110 facing the LCD panel 100. The backlight module 110 is configured to illuminate the LCD panel 100 with even planar light.

The LCD panel 100 is a normal-white type LCD panel, and includes a first substrate 101, a second substrate 102 facing the first substrate 101, a liquid crystal layer 103 sandwiched between the two substrates 101 and 102, and a first polarizer film 104 and a second polarizer film 105 respectively disposed at outer sides of the two substrates 101 and 102. Polarization axes of the first polarizer film 104 and the second polarizer film 105 are perpendicular.

The backlight module 110 includes a light source 111, a light guide plate 112, and a reflecting film 113. The light guide plate 112 includes a light incident surface 1120, a top light emitting surface 1121 adjacent to the light incident surface 1120, and a bottom surface 1122. The light source 111 is located at a side of the light incident surface 1120 and configured to emit polarized light "c". The reflecting film 113 is located at a side of the bottom surface 1122 to reflect light from the bottom surface 1122 back to the light guide plate 112.

After the polarized light emitted by the light source 111 reaches the light guide plate 112, some of the polarized light is emitted directly by the light emitting surface 1121 of the light guide plate 112 and reaches the second polarizer film 105. Other polarized light is emitted by the bottom surface 1122, and is then reflected by the reflecting film 113 back to the light guide plate 112. Finally, the other polarized light reaching the light guide plate 112 is emitted from the light emitting surface 1121 thereof and reaches the second polarizer film 105.

Some of the light reaching the second polarizer film 105 with a polarization axis parallel to a polarization axis "b" of the second polarizer film 105 (hereinafter, "first polarized light") can pass through the second polarizer film 105 to illuminate the LCD panel 100 (see below).

In detail, when driving voltages are not applied to the normal-white type LCD 10, the polarization axis of the first polarized light is rotated by 90° to become parallel with a polarization axis "a" of the first polarizer film 104 when the first polarized light passes through the liquid crystal layer 103. Thus the rotated first polarized light having the polarization axis parallel to the polarization axis "a" of the first polarizer film 104 can pass the first polarizer film 104 so that the LCD panel 100 emits light and can display images.

When driving voltages are applied to the normal-white type LCD 10, the liquid crystal molecules of the liquid crystal layer 103 twist to become oriented approximately perpendicular to the two substrates 101, 102 and thus the polarization axis of the first polarized light cannot be rotated by the liquid crystal layer 103. Understandably, the first polarized light reaching the first polarizer film 104 has the polarization axis perpendicular to the polarization axis "a" of the first polarizer film 104 and therefore cannot pass the first polarizer film 104. Thus the LCD panel 100 does not emit light and has no image.

Normally, because the polarization axis of the first polarized light is not fully parallel to the polarization axis "b" of the second polarizer film 105, only some (or most) of the first polarized light can pass through the second polarizer film 105 to eventually emit from the LCD panel 100, while the other first polarized light having polarization axes perpendicular to the polarization axis "b" of the second polarizer film 105 is absorbed by the second polarizer film 105. This may considerably reduce the operating efficiency of the normal-white type LCD 10.

What is called for, thus, is a backlight module overcoming the limitations described, and an LCD utilizing such a backlight module.

SUMMARY

In an exemplary embodiment, a backlight module includes a light guide plate, a light source and a retardation layer. The light guide plate includes a light incident surface and a light emitting surface adjacent to the light incident surface. The light source is configured to emit polarized light with a first polarization orientation, and is positioned at a side of the light incident surface. The retardation layer is disposed at a side of the light emitting surface, and is configured to rotate the first polarization orientation of the polarized light to a second polarization orientation.

Other novel features and advantages of the above-described backlight module will become more apparent from the following detailed description when taken in conjunction with the accompanying drawings. In the drawings, all the views are schematic.

DETAILED DESCRIPTION OF PREFERRED EMBODIMENTS

Reference will now be made to the drawings to describe various embodiments of the present invention in detail.

Figure 1:
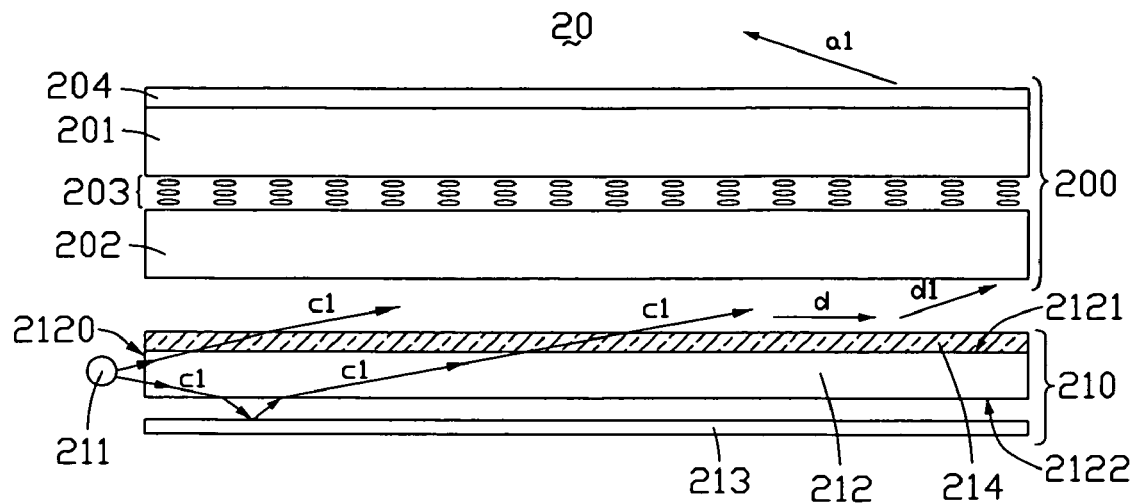
FIG. 1 is a cross-sectional view of an LCD according to a first embodiment of the present invention.

Referring to FIG. 1, a normal-white type LCD 20 according to a first embodiment of the present invention is shown. The LCD 20 includes an LCD panel 200 and a backlight module 210 facing the LCD panel 200 to illuminate the LCD panel 200 with even planar light.

The LCD panel 200 is a normal-white type LCD panel, and includes a first substrate 201, a second substrate 202 facing the first substrate 201, a liquid crystal layer 203 sandwiched between the two substrates 201 and 202, and a first polarizer film 204 disposed at an outside of the first substrate 201.

The backlight module 210 includes a light source 211, a light guide plate 212, a reflecting film 213, and a retardation layer 214. The light guide plate 212 includes a light incident surface 2120, a top light emitting surface 2121 adjacent to the light incident surface 2120, and a bottom surface 2122. The light source 211 is located at a side of the light incident surface 2120 and is configured to emit polarized light "c1". The reflecting film 213 is located at a side of the bottom surface 2122 to reflect light from the bottom surface 2122 back to the light guide plate 212. The emitted polarized light "c1" has a first polarization orientation "d".

The retardation layer 214 is located at a side of the light emitting surface 2121 to change the first polarization orientation "d" of the polarized light "c1" to a second polarization orientation "d1", which is approximately perpendicular to a first polarization axis "a1" of the first polarizer film 204. The retardation layer 214 can be made from extended materials such as polyvinyl alcohol, silicon, polycarbonate (PC), or cyclo-olefin polymer (COP).

After the polarized light "c1" emitted from the light source 211 reaches the light guide plate 212, some of the polarized light is directly emitted from the light emitting surface 2121 of the light guide plate 212 and reaches the retardation layer 214. Other polarized light emitted from the bottom surface 2122 is then reflected by the reflecting plate 213 back to the light guide plate 212. Finally, other polarized light reflected back to the light guide plate 212 is also emitted from the light emitting surface 2121 of the light guide plate 212 and reaches the retardation layer 214.

Assuming a rotation angle θ between the first polarization orientation "d" and the second polarization orientation "d1", a method for confirming the rotation angle θ and changing the first polarization orientation "d" of the polarized light to the second polarization orientation "d1" includes the following:

In step a, the first polarizer film 204, located on the light emitting surface 2121 of the light guide plate 212, is rotated clockwise. When no light is emitted from the first polarizer film 204, the first polarization axis "a1" of the first polarizer film 204 is rotated to become perpendicular to the first polarization orientation "d" of the polarized light "c1". A rotation angle of the first polarizer film 204 can be defined as the rotation angle θ between the first polarization orientation "d" and the second polarization orientation "d1".

In step b, the polarized light "c1" entering the retardation layer 214 is divided into O-type and E-type polarized light. The O-type polarized light is polarized perpendicular to an optical axis of the retardation layer 214, and the E-type polarized light is polarized parallel to the optical axis of the retardation layer 214. A phase difference δ between the O-type polarized light and the E-type polarized light after emission from the retardation layer 214 is calculated according to formula (1):

$$\delta = 2\pi(n_o - n_e)d_0/\lambda \quad (1)$$

where $n_o$ represents an index of refraction of the O-type polarized light, $n_e$ represents an index of refraction of the E-type polarized light, $d_0$ represents a thickness of the retardation layer 214, and λ represents a wavelength of the light transmitted in a vacuum.

When $\delta = (2k+1)\pi$, (k=0, 1, 2, 3 . . . ), the O-type polarized light and the E-type polarized light from the retardation layer 214 reform the polarized light "c1" having the second polarization orientation "d1". Assuming that a represents an included angle between the first polarization orientation "d" and the optical axis of the retardation layer 214, the rotation angle θ between the first polarization orientation "d" and the second polarization orientation "d1" is approximately equal to 2α.

In other words, when the included angle α between the first polarization orientation "d" and the optical axis of the retardation layer 214 is equal to θ/2, the polarization orientation of the polarized light "c1" can be rotated by the retardation layer 214 through the rotation angle θ from the first polarization orientation "d" to the second polarization orientation "d1".

When no driving voltage is applied to the LCD 20, the second polarization orientation "d1" of the polarized light "c1" is rotated by 90° to become parallel with the polarization axis "a1" of the first polarizer film 204 by the liquid crystal layer 203 after the polarized light "c1" is emitted from the retardation layer 214. Thus the polarized light "c1" having a rotated polarization orientation parallel to the first polarization axis "a1" of the first polarizer film 204 can pass the first polarizer film 204 so that the LCD panel 200 emits light and can display images.

When driving voltages are applied to the normal-white type LCD 20, polarization axes of the liquid crystal molecules of the liquid crystal layer 203 twist to become oriented approximately perpendicular to the two substrates 201, 202. Thus, the polarization orientation "d1" of the polarized light "c1" cannot be rotated by the liquid crystal layer 203. Understandably, the polarized light "c1" reaching the first polarizer film 204 has the polarization orientation "d1", which is perpendicular to the first polarization axis "a1" of the first polarizer film 204. Therefore the polarized light "c1" cannot pass the first polarizer film 204. Thus the LCD panel 200 does not emit light and has no image.

Because the retardation layer 214 can rotate the first polarization orientation "d" of the polarized light "c1" to a second polarization orientation "d1" that is approximately perpendicular to the first polarization axis "a1" of the first polarizer film 204, the polarized light "c1" passing through the liquid crystal layer 203 has a rotated polarization orientation that is parallel to the first polarization axis "a1" of the first polarizer film 204. Thereby, the rotated polarized light "c1" can be completely emit from the first polarizer film 204 so that the LCD panel 200 emits much light and can display images effectively.

Figure 2:
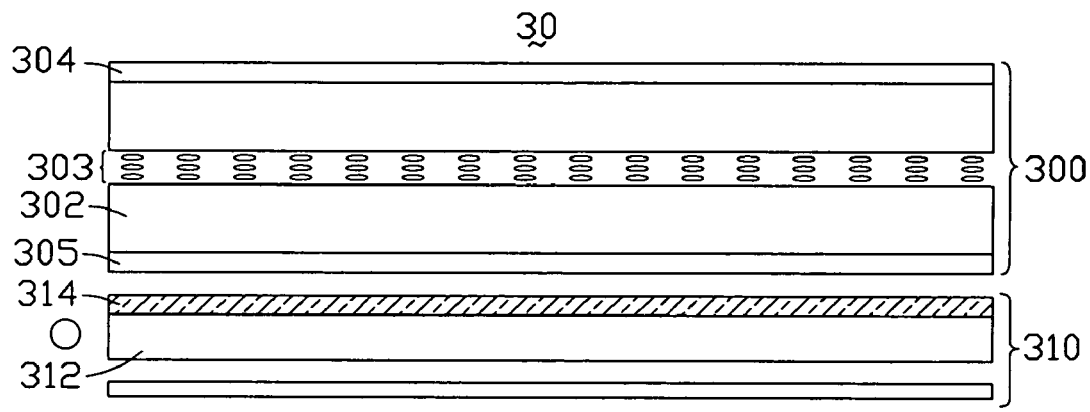
FIG. 2 is a cross-sectional view of an LCD according to a second embodiment of the present invention.
Figure 3:
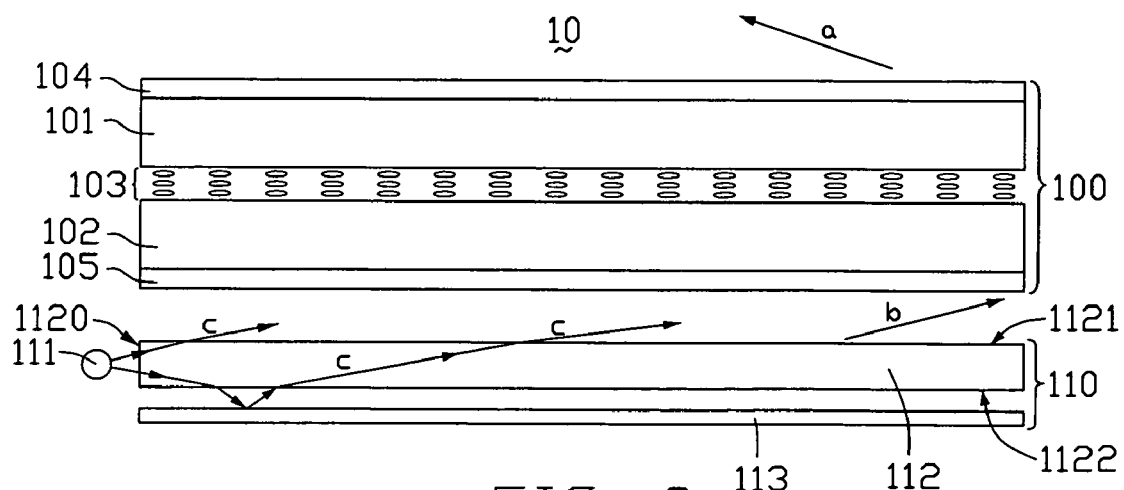
FIG. 3 is a cross-sectional view of a conventional LCD.

FIG. 2 shows an LCD 30 according to a second embodiment of the present invention, differing from the previous embodiment only in that the LCD 30 further includes a second polarizer film 305 at the outside of a second substrate 302 of an LCD panel 300. The second polarizer film 305 has a polarization axis perpendicular to that of a first polarizer film 304. The second polarizer film 305 is configured to prevent light having a polarization orientation less than perpendicular to the polarization axis of the first polarizer film 304 from passing therethrough.

In a first alternative embodiment of the present invention, the LCD 20 can also be a normal black type LCD, with the retardation layer 214 configured to rotate the first polarization orientation "d" of the polarized light "c1" to a second polarization orientation "d1", which is approximately parallel to the polarization axis of the first polarizer film 204.

In a second alternative embodiment of the present invention, the retardation layer 214 can be disposed at the outside of the second substrate 202 of the LCD panel 210.

In a third alternative embodiment of the present invention, the retardation layer 314 can be disposed at a side of the second polarizer film 305 far away from the liquid crystal layer 303.

In a fourth alternative embodiment of the present invention, the light guide plate 212 can further include a plurality of small reflective structures each of which includes an inclined surface. A distribution density of the small reflective structures gradually increases with increasing distance away from the light source 211. This configuration can help prevent the LCD panel 200 emitting uneven planar light.

In a fifth alternative embodiment of the present invention, the backlight module 310 can further include a prism and diffuser film disposed at the outside of the retardation layer 314 far from the light guide plate 312.

Those skilled in the art will readily appreciate that numerous modifications and alterations of the above-described device may be made without departing from the scope of the principles of the present invention. Accordingly, the above disclosure should be construed as limited only by the metes and bounds of the appended claims or equivalents thereof.

What is claimed is:

1. A liquid crystal display (LCD) comprising:
    an LCD panel comprising a first substrate, a second substrate facing the first substrate, a liquid crystal layer sandwiched between the two substrates, and an upper polarizer film being disposed at the first substrate, the upper polarizer film having a first polarization axis;
    a lower polarizer film being disposed at the second substrate, and comprising a second polarization axis substantially perpendicular to the first polarization axis of the upper polarizer film; and
    a backlight module adjacent to the second substrate and facing the LCD panel to illuminate the LCD panel, the backlight module comprising:
    a light guide plate comprising a light incident surface and a light emitting surface;
    a light source configured to emit polarized light with a first polarization orientation, the light source positioned at a side of the light incident surface; and
    a retardation layer disposed in an optical path between the light emitting surface and the second substrate,
    wherein the retardation layer is configured to rotate the first polarization orientation of all the polarized light emitted from the light source and transmitted to the retardation layer to a second polarization orientation, the second polarization orientation is substantially parallel to the first polarization axis of the upper polarizer film, and the rotated polarized light emitted from the retardation layer follows the optical path to the second substrate and subsequently undergoes a single pass only through the liquid crystal layer to be emitted out from the LCD via the first substrate.

2. The LCD of claim 1, wherein the retardation layer is made from material selected from the group consisting of polyvinyl alcohol, silicon, polycarbonate, and cyclo-olefin polymer.

3. The LCD of claim 1, wherein a rotation angle between the first polarization orientation and the second polarization orientation is defined as θ, the polarized light with the first polarization orientation entering the retardation layer is divided by the retardation layer into O-type polarized light and E-type polarized light, the O-type polarized light is polarized perpendicular to an optical axis of the retardation layer, the E-type polarized light is polarized parallel to the optical axis of the retardation layer, an included angle between the first polarization orientation and the optical axis of the retardation layer is defined to be equal to θ/2, and a phase difference δ between the O-type polarized light and E-type polarized light after emission from the retardation layer is satisfied by the formula:

$$\delta=(2k+1)\pi=2\pi(n_o-n_e)d_0/\lambda$$

wherein $n_o$ represents an index of refraction of the O-type polarized light, $n_e$ represents an index of refraction of the E-type polarized light, $d_0$ represents a thickness of the retardation layer, λ represents a wavelength of the polarized light transmitted in vacuum, and k is a non-negative integer.

4. The LCD of claim 1, further comprising a reflecting film positioned adjacent a bottom surface of the light guide plate.

5. The LCD of claim 1, wherein the light guide plate further comprises a plurality of small reflective structures each of which comprises an inclined surface.

6. The LCD of claim 1, wherein the retardation layer has a single layer structure.

7. The LCD of claim 1, wherein the retardation layer has a single optical axis.

* * * * *